(12) United States Patent
Scribner et al.

(10) Patent No.: US 10,369,742 B2
(45) Date of Patent: Aug. 6, 2019

(54) REINFORCEMENT SYSTEM FOR ADDITIVE MANUFACTURING, DEVICES AND METHODS USING THE SAME

(71) Applicant: Southwest Research Institute, San Antonio, TX (US)

(72) Inventors: Cliff James Scribner, San Antonio, TX (US); Albert Joseph Parvin, Jr., San Antonio, TX (US); Darrel Ray Barnette, Austin, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 779 days.

(21) Appl. No.: 14/981,014

(22) Filed: Dec. 28, 2015

(65) Prior Publication Data

US 2017/0182712 A1    Jun. 29, 2017

(51) Int. Cl.
| | |
|---|---|
| *B29C 64/188* | (2017.01) |
| *B29C 64/209* | (2017.01) |
| *B29C 64/264* | (2017.01) |
| *B29C 64/336* | (2017.01) |
| *B29C 64/40* | (2017.01) |
| *B29C 64/112* | (2017.01) |
| *B29C 64/295* | (2017.01) |
| *B29C 64/268* | (2017.01) |
| *B29C 64/20* | (2017.01) |
| *B33Y 30/00* | (2015.01) |
| *B33Y 40/00* | (2015.01) |
| *B29C 64/194* | (2017.01) |
| *B29C 64/165* | (2017.01) |

(52) U.S. Cl.
CPC ............ *B29C 64/112* (2017.08); *B29C 64/20* (2017.08); *B29C 64/209* (2017.08); *B29C 64/264* (2017.08); *B29C 64/268* (2017.08); *B29C 64/295* (2017.08); *B29C 64/336* (2017.08); *B29C 64/40* (2017.08); *B29C 64/165* (2017.08); *B29C 64/188* (2017.08); *B29C 64/194* (2017.08); *B33Y 30/00* (2014.12); *B33Y 40/00* (2014.12)

(58) Field of Classification Search
CPC ... B29C 64/165; B29C 64/188; B29C 64/194; B29C 64/209; B29C 64/264; B29C 64/268; B29C 64/273; B29C 64/295; B29C 64/336; B29C 64/40; B33Y 30/00; B33Y 40/00
See application file for complete search history.

(56) References Cited

U.S. PATENT DOCUMENTS

| | | |
|---|---|---|
| 5,866,058 A | 2/1999 | Batchelder et al. |
| 7,297,304 B2 | 11/2007 | Swanson et al. |
| 2014/0048969 A1 | 2/2014 | Swanson et al. |

(Continued)

*Primary Examiner* — Joseph S Del Sole
*Assistant Examiner* — Joseph S Leyson
(74) *Attorney, Agent, or Firm* — Grossman, Tucker at al

(57) ABSTRACT

Reinforcement systems for additive manufacturing are disclosed. In some embodiments, the reinforcement systems include a print head assembly including a print head that is configured to form a plurality of layers of an additively manufactured article, and a reinforcement head. The reinforcement head may be configured to form at least one reinforcement element on or within a working layer of the plurality of layers formed by the print head. Additive manufacturing systems including such reinforcement systems and methods of additive manufacturing using those reinforcement systems are also disclosed.

18 Claims, 10 Drawing Sheets

(56) References Cited

U.S. PATENT DOCUMENTS

| | | |
|---|---|---|
| 2014/0159273 A1 | 6/2014 | Koop et al. |
| 2014/0328963 A1 | 11/2014 | Mark et al. |
| 2014/0333011 A1 | 11/2014 | Javidan et al. |
| 2015/0360427 A1* | 12/2015 | Shah ................... B29C 71/04 264/489 |
| 2017/0312985 A1* | 11/2017 | Talgorn ................ B33Y 80/00 |

* cited by examiner

REINFORCEMENT SYSTEM FOR ADDITIVE MANUFACTURING, DEVICES AND METHODS USING THE SAME

FIELD

The present disclosure generally relates to reinforcement systems for additive manufacturing. Devices and methods of using such systems are also disclosed.

BACKGROUND

Additive manufacturing, also referred to herein as three dimensional (3D) printing, is a process that creates or augments a three dimensional object by laying down successive layers of material, often on a print bed, to form an object with a desired design. Although a wide variety of additive manufacturing techniques have been developed, in recent years systems that employ fused filament fabrication (FFF) (also known as FUSED DEPOSITION MODELING® or FDM®) have grown increasingly popular. In general, FFF systems form three dimensional objects from one or more raw filamentary part materials using a computer controlled print head that includes an extrusion nozzle. More specifically, based on digital design of a desired 3D object, a computer causes a print head to move in the x, y, and z dimensions, e.g., over a print bed. At the same time, raw part material (e.g., in the form of a spooled filament) is fed into the print head. The raw part material is softened (e.g., by heating above its glass transition temperature), extruded through an extrusion nozzle, and deposited as a "layer" or "path" e.g., on the print bed or a previously deposited layer. Following its deposition, the deposited material solidifies as its temperature drops, and may also fuse to adjacent surfaces, e.g., of a previously deposited layer, the print bed, etc. After a layer of the object is formed, the position of the print head may then be incremented along the z-axis (e.g., perpendicular an x-y plane), and the process may then be repeated iteratively until the object is completely built up.

With the foregoing in mind, parts formed by many additive manufacturing techniques and in particular fused filament fabrication tend to have physical property limitations, particularly in the direction transverse to the material deposition direction (also referred to herein as the "machine direction). For example parts manufactured via fused filament fabrication may exhibit directionally dependent (i.e., anisotropic) tensile strength and/or shear flow properties, with such properties being relatively weak in the direction transverse to the machine direction. As a result, the physical properties of parts formed by additive manufacturing processes may be weaker than similar parts manufactured by injection molding or casting, wherein the full volume of a part may be formed simultaneously and homogenously. Parts formed by additive manufacturing processes such as fused filament fabrication may therefore be unsuitable and/or undesirable for certain applications.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
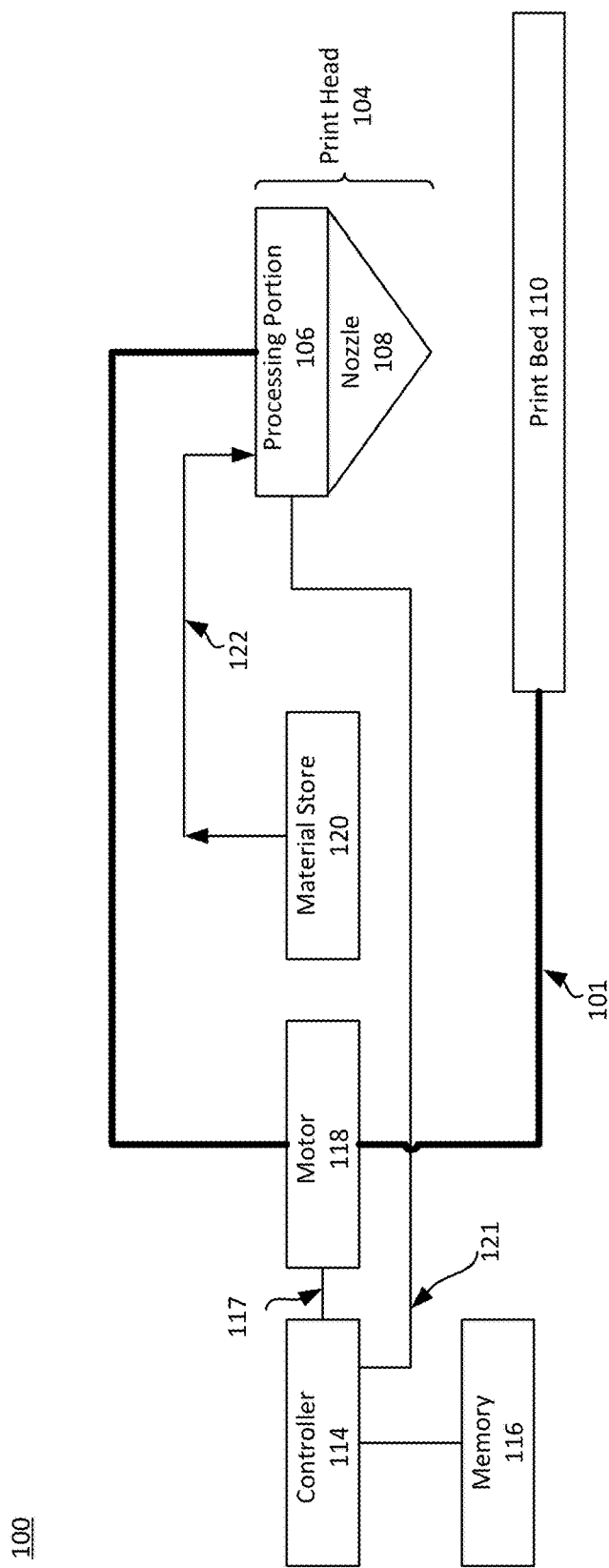
FIG. 1 is a simplified block diagram illustrating components of one example of an additive manufacturing system including a deposition assembly including a print head.

Although the following detailed description will proceed with reference being made to illustrative embodiments, many alternatives, modifications, and variations thereof will be apparent to those skilled in the art.

DETAILED DESCRIPTION

While the present disclosure is described herein with reference to illustrative embodiments for particular applications, it should be understood that such embodiments are exemplary only and that the invention as defined by the appended claims is not limited thereto. Those skilled in the relevant art(s) with access to the teachings provided herein will recognize additional modifications, applications, and embodiments within the scope of this disclosure, and additional fields in which embodiments of the present disclosure would be of utility.

For the purpose of the present disclosure, the term "print head," "print," and the like mean any device or technique that deposits or creates material on a surface in a controlled manner.

As used herein the terms "path" and "layer" are interchangeably used to refer to a layer of material deposited by a print head, e.g., during a fused filament fabrication or other 3D printing process. The term "working layer" is used to refer to a path that is currently being deposited by a print head. In contrast the phrases "previously deposited layers," "previous layers," and "previous paths" and the like refer to paths that were previously deposited by a print head.

As used herein the term "machine direction" refers to the direction along which layers (and in particular, working layers) are deposited by a print head of a 3D printer, or more particularly, by an extrusion nozzle thereof.

As explained above various additive manufacturing technologies have been developed and are now in widespread use. Although such technologies are useful, some 3D printing processes may produce parts that exhibit anisotropic properties, and in particular anisotropic strength properties. For example, articles produced by fused filament fabrication may exhibit tensile strength and/or shear strength properties that are relatively high in the machine direction, but which may be relatively low in other directions, such as directions transverse to the machine direction.

Without wishing to be bound by theory, in the context of fused filament fabrication (FFF) it is believed that anisotropic strength properties may arise at least in part from discontinuous application of part material as working layers are deposited using a print head including an extrusion nozzle. In that regard it is noted that many FFF systems employ a print head that deposits one or more working layers of relatively hot, relatively viscous part material as the head is moved along a machine direction. As each working layer is deposited, the part material cools, solidifies, and in some cases fuses to the surface upon which it is deposited. The material of the working layer may also curl and/or undergo plastic deformation following its deposition. The degree to which the working layer may curl and/or plastically deform may vary from working layer to working layer, e.g., due to uneven thermal gradients which may be present as the material is deposited, variation in material density as the material of the working layer transitions from a hot viscous state to a cooled hardened state, etc. The shape and/or amount of material deposited by the print head may therefore differ from working layer to working layer. In some instances this can result in the development of interfacial thermal stresses which can weaken the manufactured part in one or more dimensions. While such stresses can be mitigated to some degree by exposing the formed part to elevated temperatures (e.g., by creating a 3D part within an elevated temperature chamber that is completely enclosed or using a preprogrammed and heated print bed in a non-enclosed volume), the resulting part may still exhibit properties that are too weak for some applications.

Alternatively or in addition to the above, it is believed that anisotropic strength properties observed in parts manufactured by fused filament fabrication may also be attributable to variability in the fusing of the material of the working layer to previously deposited layers in the z, x, and y directions. As noted previously an FFF system may deposit a working layer by extruding part material through an extrusion nozzle of a print head as the print head is moved in the machine direction. When the part material is initially deposited it is in a relatively hot viscous state, whereas previously deposited layers may be in a relatively cool solid state. Therefore when a working layer is deposited on a previous layer (e.g., when a region of a part is built up in the z (height) dimension), the relatively hot viscous material of the working layer may come into close contact with and fuse to an upper surface of the underlying previous layer. In contrast, the viscous material of the working layer may not contact or may not significantly contact adjacent layers in the x and y directions due to various factors. As may therefore be appreciated, relatively strong bonding may be present between adjacent layers in the z-dimension, but such bonding may be relatively weak or even absent between adjacent layers in the x-y plane.

Still further, it is believed that anisotropic strength properties observed in parts manufactured by FFF systems may be at least partially attributable to the cross section of the extrusion nozzle used in the print head of such systems. For example, some FFF systems utilize a print head that includes an extrusion nozzle having a circular or oval cross section. Such systems may therefore deposit layers that have a corresponding circular or oval cross section. As such heads are used to deposit layers of part material, strata-like ridges may be formed between adjacent layers in the z dimension and in the x-y plane. Such features may limit or even prevent physical contact between adjacent layers in certain dimensions, and particularly between adjacent layers in the x-y plane. Those features may also present opportunities for mechanical failure and/or stress concentration when the part is exposed to mechanical stress, e.g., before or after it is completed. In any case, the strength with which adjacent layers are coupled to one another may be governed at least in part by the ability of hot viscous working layer material to join with the (generally non-viscous) material of adjacent previously deposited layers, e.g., by entanglement of polymer chains, fusing, etc.

With the foregoing in mind, the present disclosure generally relates to reinforcement systems for additive manufacturing, as well as devices and methods that utilize such systems. As will be described in detail later, the technologies described herein leverage the formation and/or installation of reinforcing elements on and/or within a working layer formed by an additive manufacturing system, and in particular working layers formed via fused filament fabrication. Such reinforcing elements may enhance physical coupling between a working layer and one or more adjacent but previously deposited layers, e.g., in the x dimension, y dimension, z-dimension, or some combination thereof. As will be discussed, in some instances the reinforcing elements may enhance the strength and/or other properties of all or a portion of an additively manufactured article in one or more dimensions. Moreover, the technologies described herein may open avenues to customizing the strength and other properties of additively manufactured articles, either in their entirety or in a localized (e.g., layer by layer) fashion.

To further illustrate the above mentioned issues with additively manufactured parts, the instant application will begin with a description of one example of a system for producing articles via fused filament fabrication. Following that discussion, various embodiments of the present disclosure will be discussed, in which reinforcing elements are generated or installed during the production of an additively manufactured part.

Reference is now made to FIG. 1, which is a simplified block diagram illustrating components of one example of an additive manufacturing system that may produce parts via fused filament fabrication. In the illustrated embodiment, additive manufacturing system 100 includes a frame 101, a print head 104, a substantially planar print bed 110, a motor 118, and a material store 120. Motor 118 and print head 104 may be coupled to a controller 114, e.g., via control lines 117, 121, respectively. Alternatively, controller 114 may communicate with motor 118 and/or print head 104 wirelessly. Although not shown, controller 114 may also control the operation of material store 120, e.g., wirelessly or via one or more control lines. In any case, controller 114 may be in communication with a memory 116, which may store, for example, a computer model of a part to be produced, instructions for directing the deposition of part material to form a physical copy of a part, etc. Material store 120 is generally configured to store and/or provide raw part material 122 (e.g., in the form of one or more filaments) to print head 104.

In general, print head 104 may be coupled to drive components (pulleys, cables, screws etc., not shown), which in turn may be coupled to motor 118. In response to instructions from controller 114, motor 118 and associated drive components may function to move print head 104, e.g., along an x, y, and/or z axis within frame 101 and above print bed 110. As print head 104 is moved, raw part material 122 (e.g., in the form of one or more filaments) may be supplied to it from material store 120. Material store 120 may be coupled to or include drive mechanisms for providing part material 122 to print head 104, such as screw drive, a worm drive, another suitable drive mechanism, or the like.

Print head 104 may function in part to soften part material provided to it from material store 120 or, in some instances, part material 122 may be softened prior to its delivery to print head 104. In the former case print head 104 may include a processing portion 106 which may heat raw part material 122, e.g., to above its glass transition temperature. The resulting softened part material 122 may be forced through one or more openings in nozzle 108 and deposited on print bed 110 or a previously deposited layer as print head 104 is moved along a machine direction. The process may continue with print head 104 iteratively depositing working layers of part material 122, resulting in the build-up and eventual completion of a physical copy of a computer model of a part.

More specifically, a user may input or otherwise cause the transfer of a computer model (e.g., in a computer aided design or other format) to controller 114, which may store the model in memory 116. When system 100 is operated, controller 114 may retrieve the model from memory 116 and translate it into commands that are recognizable by motor 118, print head 104, and optionally material store 120. For example, controller 114 may transmit commands to motor 118, wherein the commands cause motor 118 to move print head 104 along one or more paths in the x, y, and/or z dimensions. In addition, controller 114 may transmit commands to print head 104 and/or material store 120, wherein such commands cause print head 104 to process raw part material 122 (e.g., filament) into a softened, e.g., with processing portion 106. Moreover, commands from controller 114 may cause print head 104 to force the softened part material 122 through an orifice (not shown) of a nozzle 108. Nozzle 108 may therefore be in the form of an extrusion nozzle that includes one or more orifices, wherein such orifices have a fixed or variable cross sectional shape and/or orientation.

In the foregoing manner print head 104 may deposit layers of softened part material 122 onto print bed 110 or one or more previously deposited layers $202_n$, where n is a positive integer. Following its deposition, softened part material 122 may cool until it hardens, and may fuse to adjacent layers in one or more dimensions. In some embodiments, part material 122 may also cure following its deposition. Depending on the nature of the part material 122, such curing may occur intrinsically or in response to application of a curing agent such as ultraviolet light, a chemical curing agent, or the like.

As noted previously part material 122 may be stored in material store 120, and may be supplied to print head 104 in any suitable manner. While the above description focuses on embodiments in which part material is filamentary in form, it should be understood that part material 122 may be in any suitable form while it is stored in material store 120 and/or supplied to print head 104. For example, part material 122 may be in the form of filament, granules, powder, nanoparticles, combinations thereof, and the like. Without limitation, in some embodiments part material 122 is in the form of filament.

A wide variety of materials may be used as part material 122, as will be understood in the art. For example, in some embodiments part material 122 is or includes one or more materials that may be deposited via extrusion. Non-limiting examples of such materials includes thermoplastics such as polylactic acid (PLA), acrylonitrile butadiene styrene (ABS), thermoplastic rubbers, silicones, acrylics, polyamide (nylon), glass filled polyamide, thermoplastic epoxy resins, thermoplastic photopolymers, animal, plant, or petroleum based waxes, combinations thereof, and the like. Alternatively or additionally, part material 122 may be formed from or include metals (e.g., titanium, aluminum, etc.), alloys (e.g., steel), mortar, cement (e.g., water-based cementitious materials) combinations thereof, and the like. Without limitation, in some embodiments part material 122 is a filament formed from one or more thermoplastic polymers, such as one or a combination of the thermoplastic polymers noted above. Alternatively, in some embodiments part material 122 is in the form of mortar, cement, or a combination thereof.

Figure 2A:
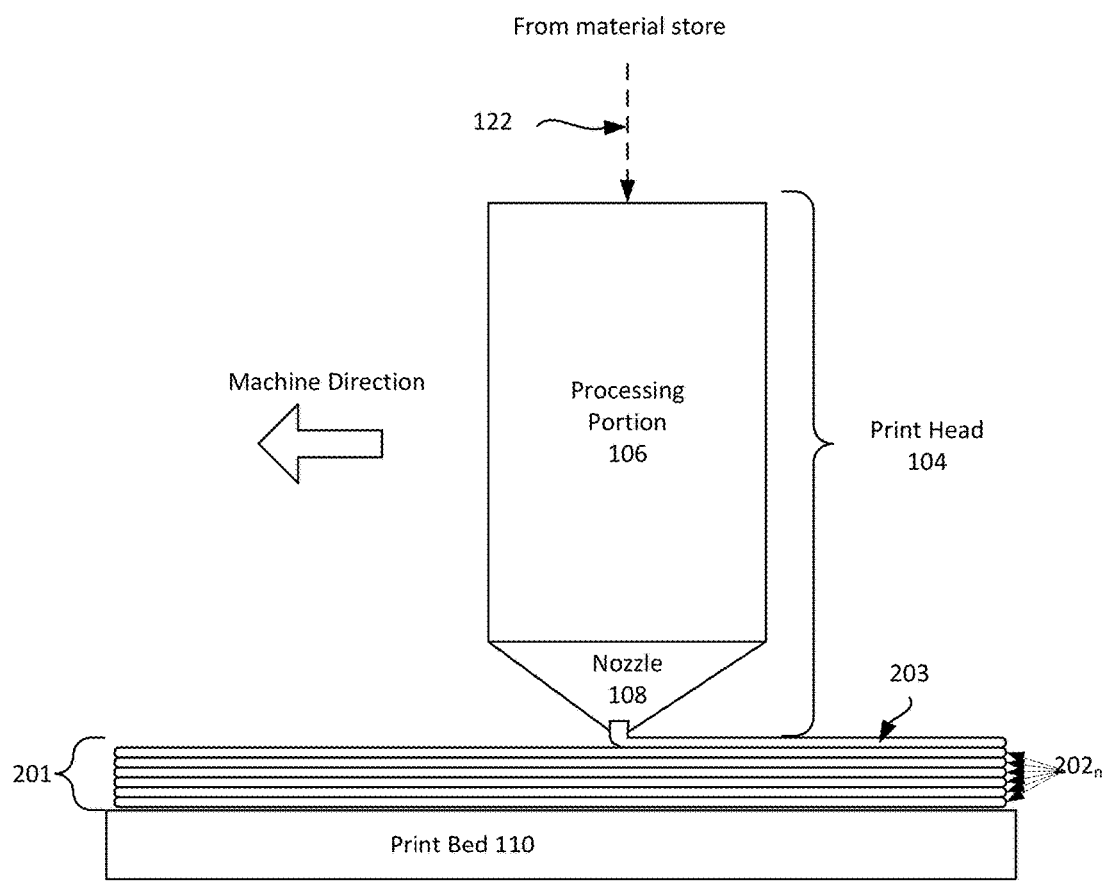
FIG. 2A is a schematic illustration of one example of a print head suitable for use in an additive manufacturing system.

Reference is now made to FIGS. 2A-2D. In general, FIG. 2A provides schematic view of the deposition of working layers 203 by print head 104, in this case on one or more previously deposited layers $202_n$ as print head 104 is moved in a machine direction. For the sake of example, working layer 204 is illustrated in FIG. 2A (and various other FIGS.) as being deposited on one or more previously formed layers $202_n$ in structure 201, wherein the working layer 203 and previously deposited layers $202_n$ have the same cross sectional geometry and thickness. It should be understood however that such illustration is for the sake of example only and that working layers may be deposited at any suitable location, and may have the same or different cross sectional geometry.

Figure 2B:
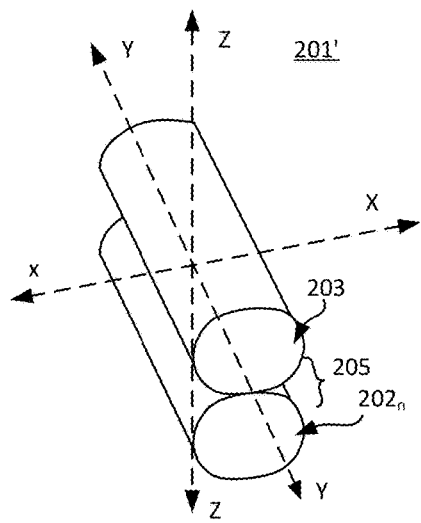
FIGS. 2B-2D depict perspective views of example working layers and previously deposited layers produced by a print head consistent with the embodiment of FIG. 2A.
Figure 2C:
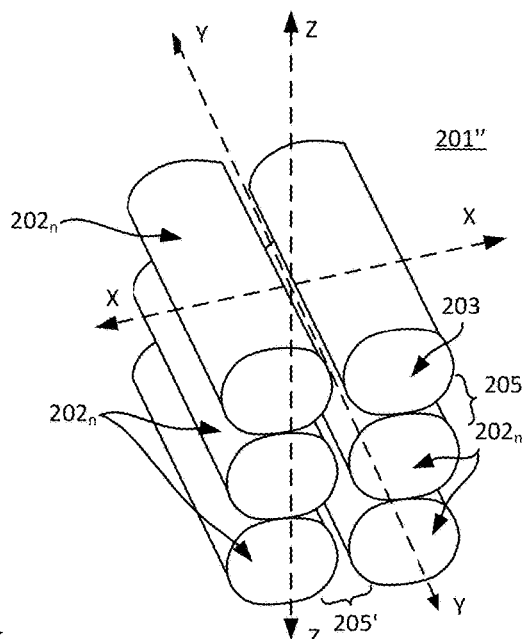
Figure 2D:
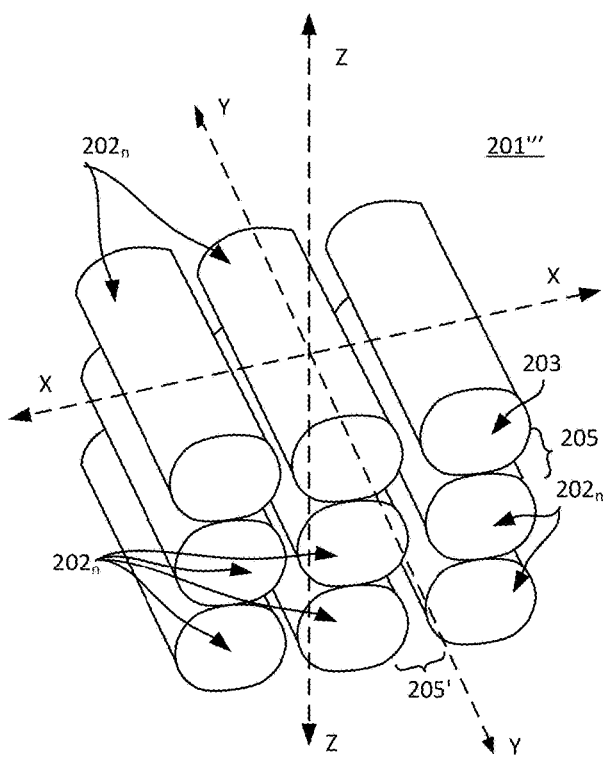

FIGS. 2B-2D illustrate three examples of different structures (in this case, walls) that may be formed by system 100. As shown in FIG. 2B for example, controller 114 may cause print head 104 to form a wall 201' that is one layer thick in the x-dimension and one layer thick in the z dimension. Controller 114 may accomplish this, for example, by causing print head 104 to iteratively deposit a working layer 203 of part material 122 onto a previously deposited layer $202_n$ as print head 104 is moved in a machine direction, in this case along the y axis. During such deposition, at least a portion of the bottom surface (not shown) of working layer 203 may come into relatively close contact with an upper surface (not labeled) of previously deposited layer $202_n$ as working layer 203 is deposited.

Following its deposition, the relatively hot, relatively viscous material of working layer 203 may cool and fuse to the upper surface of a previously deposited layer $202_n$, resulting in the formation of a relatively strong bond between working layer 203 and previously deposited layer $202_n$ in the z dimension. That bond may impart relatively good strength properties to wall 201' along the y axis, and potentially along the z axis as well. In this embodiment however, no additional working layers or previously deposited walls are present along the horizontal (x) axis. The sides (not labeled) of working layer 203 may therefore be unsupported by adjacent layers in the x-dimension, leading to instability and part weakness in the x dimension. This weakness may be exacerbated by the cross sectional geometry of the working layer 203 and previously deposited layer $202_n$. For example, in the illustrated embodiment working layer 203 and previously deposited layer $202_n$ both have an elliptical cross section, leading to the presence of regions (e.g., strata, gaps, ridges, etc.) 205 of relatively poor contact between the outer surface of working layer 203 and previously deposited layer $202_n$ in the z-dimension. In some embodiments, such regions 205 may be in the form of gaps in the contact between layers deposited by system 100.

The strength and/or stability of wall 201' may be improved by supporting one or both the sides of working layer 203 and/or one or more previously deposited layers $202_n$, e.g., with one or more additional layers or other structures. This concept is illustrated in FIGS. 2C and 2D, which depict walls 201" and 201'" that are two and three layers thick in the x dimension, respectively, and three layers thick in the z dimension. As can be seen, in both embodiments at least a portion of the bottom surface of working layer 203 may come into relatively close contact with an upper surface of one or more previously deposited layers $202_n$ in the z dimension. However due to various factors contact between the sides of working layer 203 and one or more previously deposited layers $202_n$ in the x dimension may be limited.

More specifically, working layer 203 may be deposited such that a first area of contact is present between it and an underlying layer, e.g., in the z-dimension. In contrast, a second area of contact may be present between working layer 203 and an adjacent layer in the x dimension, wherein the second area of contact is smaller than the first area of contact. Alternatively or additionally, in some embodiments there is no or substantially no contact between a working layer 203 and one or more adjacent previously deposited layers in the x-dimension. In such cases it may be understood that a gap is present between such layers. This concept is illustrated in FIGS. 2C and 2D, which illustrate walls 201" and 201'" as including regions (e.g., strata, gaps, ridges, etc.) 205' of no or relatively poor contact between adjacent layers in the x-dimension. In any case, it may be appreciated that the degree and/or strength of bonding between a working layer 203 and adjacent layers in the x-dimension may be less than the degree and/or strength of bonding between the working layer and an adjacent layer in the z-dimension. Consistent with the foregoing explanation, walls 201" and 201'" may therefore exhibit anisotropic strength and/or shear properties. Specifically, walls 201" and 201'" may exhibit relatively high tensile and/or shear strength along the y axis and potentially along the z-axis, but may exhibit relatively low tensile and/or shear strength along the x axis.

With the foregoing in mind, one aspect of the present disclosure relates to additive manufacturing systems that are configured to reinforce one or more layers of an additively manufactured article. In this regard reference is made to FIG. 3, which is a simplified block diagram illustrating components of one example of an additive manufacturing system 300 consistent with the present disclosure. For the sake of example, the present disclosure will focus on embodiments in which additive manufacturing system 300 is used to produce an article via fused filament fabrication, but it should be understood that the technologies described herein may be applied to additive manufacturing systems that produce parts in a different manner, such as via selective layer sintering, selective layer melting, laminated object manufacturing, other 3D printing techniques, combinations thereof, and the like.

As shown, system 300 includes a frame 101, a print head 104, a substantially planar print bed 110, a controller 114, a memory 116, a motor 118, and a material store 120. The nature and operation of such components is generally the same as set forth above with regard to FIG. 1, and therefore such aspects are not described in detail again here in the interest of brevity. In addition to such components, system 300 includes reinforcement head 306 and optionally a reinforcement store 308, which may be coupled to controller 114 via control lines 321, 321' respectively. Alternatively or additionally, controller 114 may communicate wirelessly with reinforcement head 306 and/or optional reinforcement store 308.

Figure 3:
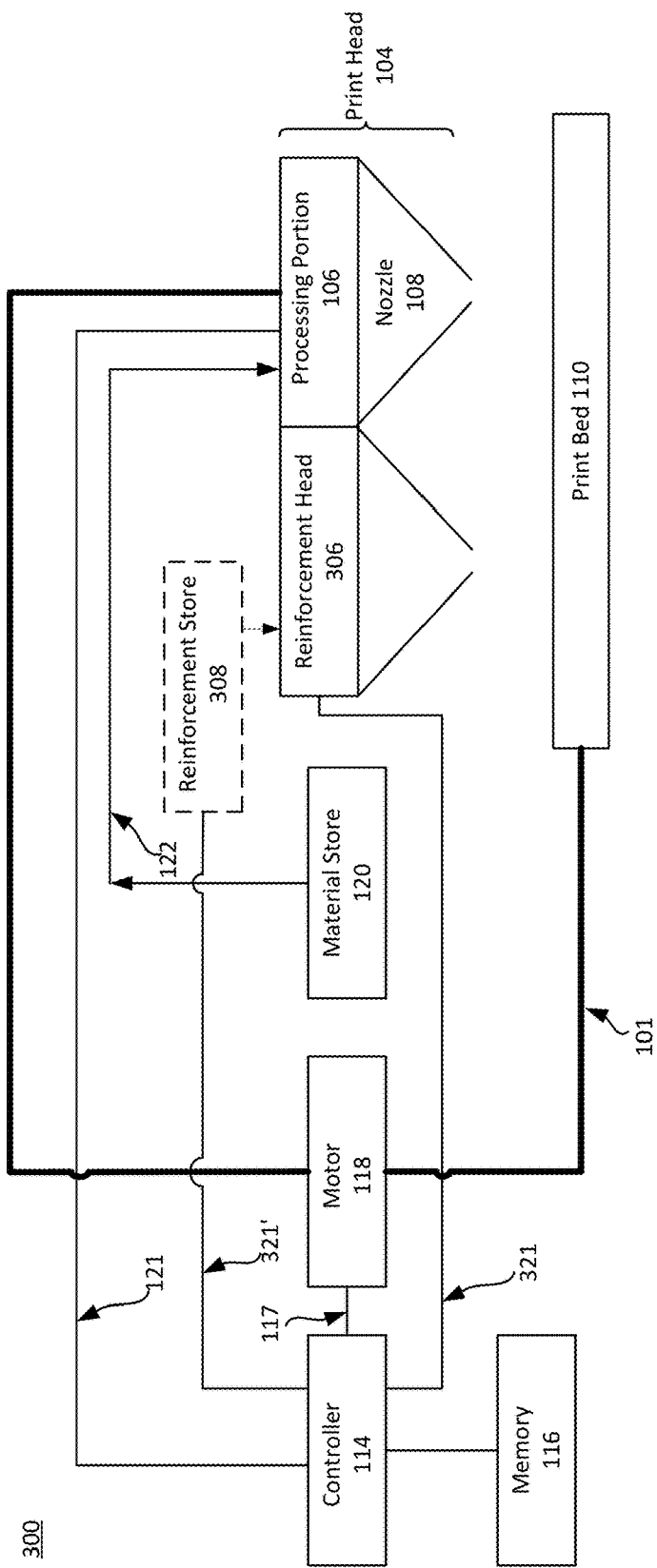
FIG. 3 is a block diagram illustrating components of one example of an additive manufacturing system including a reinforcement head consistent with the present disclosure.

In the embodiment of FIG. 3 (and in various other FIGS), reinforcement head 306 is illustrated as being coupled to print head 304. In such embodiments it may be understood that reinforcement head may move in conjunction with print head 304, e.g., as print head is translated in the x, y, and z dimensions by controller 114 and motor 118. That is, in such embodiments it may be understood that reinforcement head 306 may be integral with or coupled to print head 104, such that reinforcement head 306 and print head 104 may move in tandem. In instances where reinforcement head 306 is integral with print head 104, it may be understood that such components form part of the same monolithic structure, e.g., a printing assembly. It is further noted that in the embodiment of FIG. 3 and in various other embodiments, reinforcement head 306 is shown as being coupled to and/or integral with processing portion 106 of print head 104. It should be understood that such illustrations are for the sake of example and ease of understanding, and that reinforcement head 306 may be coupled to or integral with any suitable portion of print head 104.

Of course such illustrations are for the sake of example only, and it should be understood that reinforcement head 306 need not be coupled to or integral with print head 104. Indeed, the present disclosure envisions embodiments in which reinforcement head 306 and print head 104 are separate from one another and may be moved independently of one another, e.g., in response to commands from controller 114. In such instances it may be appreciated that reinforcement head 306 may be coupled to motor 118 and/or a different motor, e.g., via various drive components such as drive screws, pulleys, wires, and the like, such that it may move independently of print head 104.

In general, reinforcement head 306 functions to form or install reinforcing elements on and/or within a working layer during the production of an additively manufactured article. As will be explained in further detail below, such reinforcing elements may function to reinforce one or more layers of an additively manufactured article in one or more dimensions. Alternatively or additionally, such reinforcing elements may enhance the coupling of two or more adjacent layers in the x, y, and/or z dimensions. As will become apparent, use of such reinforcing elements may enable users to tailor the tensile strength, shear strength, and/or other properties of an additively manufactured article, e.g., on a layer by layer basis.

As used herein, the terms "reinforcing element," and "reinforcement element," are interchangeably used to refer to physical, mechanical, or other features which may formed on and/or installed in a working layer during an additive manufacturing process. As will be described later, the reinforcement heads of the present disclosure may be configure to form and/or install a wide variety of reinforcing elements on or within a working layer, such as but not limited to reinforcing structures and reinforcing articles.

As used herein, the terms "reinforcing structure," and "reinforcement structure," are interchangeably used to refer to a subset of reinforcing elements that are integrally formed on or within a working layer. More specifically such terms refer to structures that are defined by the material(s) of the working layer itself. For example, in some embodiments reinforcement head 306 may be configured to form reinforcing structures in the form of channels, dimples, holes, moats, ridges, slots, swivel grooves, switchback grooves, cross hatched features, etc., combinations thereof, and the like, e.g., in one or more surfaces of a working layer. For example, reinforcement head 306 in some embodiments may be configured to form reinforcing structures in an upper surface of a working layer, one or more side surfaces of a working layer, or a combination thereof. In any case, reinforcement structures may be formed continuously or discontinuously in a surface of a working layer. In the latter case, discrete reinforcement structures may be formed, and may be disposed in a random, semi-random, homogenous, non-homogenous, or other fashion along the surface of the layer in question.

Generally, the reinforcing structures described herein are configured to extend partially through the thickness of the working layer in the z, x, and/or y dimensions. Put in other terms, in some embodiments the reinforcing structures described herein have a depth, wherein the depth ranges from greater than 0% to about 99% of the thickness of a working layer in at least one dimension (e.g., the z-dimension, the x-dimension, or the y-dimension) that is perpendicular or substantially perpendicular to the side of the working layer in which the reinforcing structure is formed. Without limitation, the reinforcing structures in some embodiments have a depth ranging from greater than 0% to about 90%, such as from greater than or equal to 5% to about 80%, greater than or equal to 10% to about 70%, greater than or equal to about 20% to about 60%, or even greater than or equal to about 25% to about 50% of the thickness of a working layer in the z-dimension, x-dimension, or y-dimension.

The thickness of the working layers described herein may vary widely depending on various features including the size of the article being formed and the end application. For example, working layers having a thickness in the z-dimension ranging from less than about 1 micron to greater than about 1 meter are contemplated by the present disclosure. In some embodiments, the working layers described herein have a thickness ranging from about 1 micron to about 1000 millimeters (mm), such as from about 10 microns to about 10 mm, about 100 microns to about 5 mm, or even about 1 mm to about 5 mm. Of course such ranges are enumerated for the sake of example only, and working layers of any suitable thickness may be utilized.

As will be described in further detail with reference to FIGS. 4-6, reinforcing elements may be applied to facilitate mechanical engagement between adjacent layers in one or more dimensions. For example when a working layer is deposited on a previous layer that includes one or more reinforcing structures on an upper surface thereof, the relatively hot, relatively viscous material of the working layer may flow into and partially or completely fill the reinforcing structures in the previously deposited layer. Depending on their configuration, the reinforcing structures may enhance bonding between the previously deposited layer and the material of the working layer, potentially increasing tensile and/or shear strength exhibited by the combination of those layers. Alternatively or additionally, the reinforcing structures may be configured such that when they are filled by the material of the working layer, they may mechanically interfere with movement of the working layer material relative to the previously deposited layer in one or more dimensions. For example, the reinforcing structures may be configured such that when they are completely or partially filled with the material of the working layer, a form locking connection between the working layer and the previously deposited layer may result in one or more dimensions. As may be appreciated, appropriate configuration and use of reinforcing structures may therefore enable enhancement of tensile and/or shear strength properties exhibited by elements of an additively manufactured article that are formed by two or more layers. For example, the reinforcement elements described herein may define a cross hatched or in-fill structure which extends between two or more layers in a 3D printed part.

In contrast to reinforcing structures, the terms "reinforcing article," "reinforcement article," and the like are interchangeably used herein to refer to a subset of reinforcing elements that are installed in (i.e., added to) a working layer and/or on one or more previously deposited layers during an additive manufacturing operation. Accordingly, reinforcing articles may be understood to be structures that are distinct from but which may be installed on or into the material of a layer, such as a working layer. Non-limiting examples of reinforcing articles include jacks, posts, spheres, staples, tetrapods, hooks, elongated articles (e.g., wires, filaments, yarns, strings, etc.), combinations thereof, and the like. Of course, such reinforcing articles are identified for the sake of example only, and reinforcing articles having any suitable shape or configuration may be used in the context of the present disclosure. Without limitation, in some embodiments, the reinforcing heads described herein are configured to install one or more reinforcing articles into a working layer, wherein the reinforcing articles are in the form of posts, staples, or an elongated article such as a wire, filament, or yarn.

While the foregoing description describes reinforcing structures as being distinct from reinforcing articles, it should be understood that the technologies of the present disclosure may employ combinations of reinforcing structures and reinforcing articles at the same time. Indeed in some embodiments the reinforcement heads described herein are configured to form reinforcing structures and install reinforcement articles in a surface of a working layer. For example, in such embodiments the reinforcement head may form reinforcement elements in the form of holes, channels, divots, or the like within a surface of the working layer, and to install one or more reinforcement articles such as posts, staples, or an elongated articles (e.g., a sewn or unsewn wire or thread) within and/or proximate to the reinforcing structures.

Figure 4:
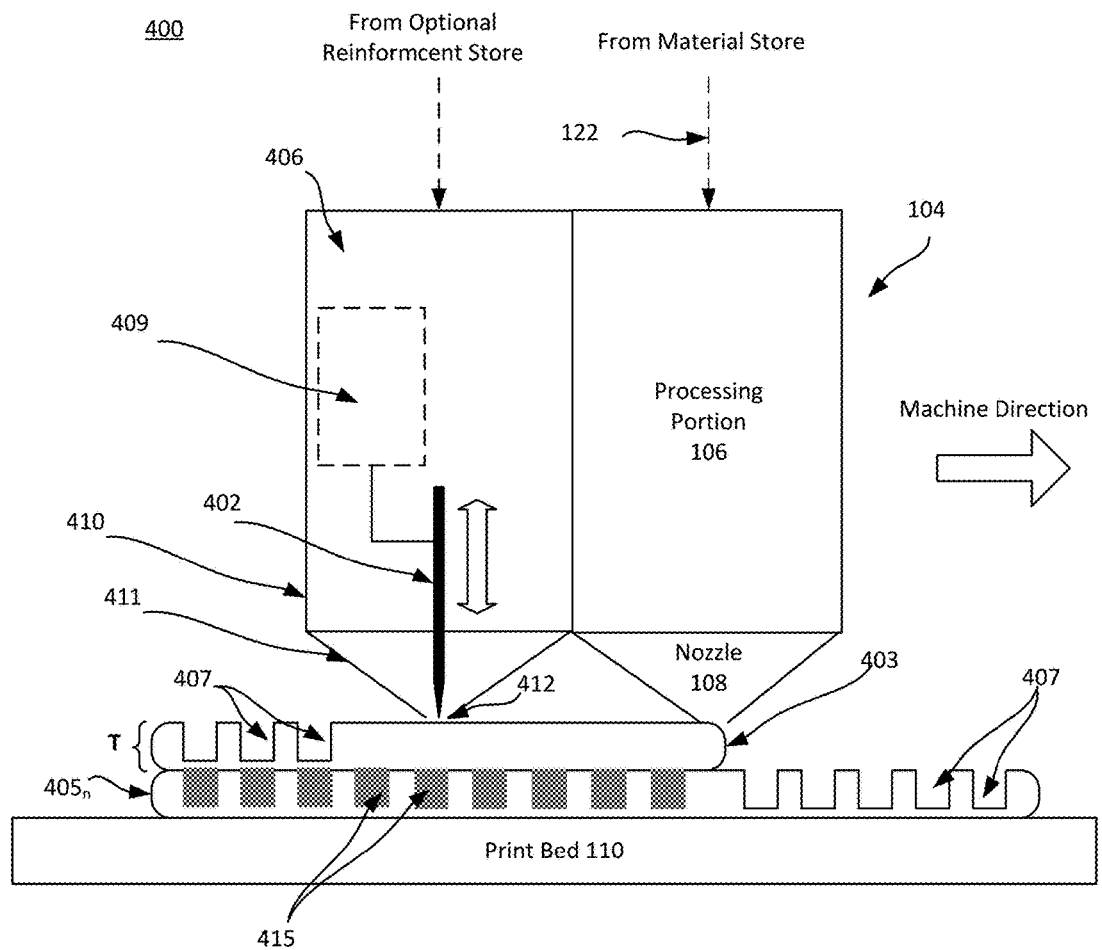
FIG. 4 is a schematic illustration of one example of an additive manufacturing system including a reinforcement head configured to produce a reinforcing structure in a working layer, consistent with the present disclosure.

Reference is now made to FIG. 4, which is a schematic illustration of one example of an additive manufacturing system 400 including a reinforcement head configured to produce a reinforcing structure in a working layer, consistent with the present disclosure. In this embodiment, additive manufacturing system 400 includes a print head 104 and a reinforcement head 406 coupled thereto, e.g., in the manner previously described above in connection with print head 104 and reinforcement head 306 in FIG. 3. It is noted that for the sake of clarity, FIG. 4 provides a zoomed in view of the print head 104 and reinforcement head 406 as they are being used to form a working layer on a previously deposited layer, e.g., in an additive manufacturing operation. It should be understood however that additive manufacturing system 400 may include other components, such as but not limited to the various components of additive manufacturing system 300 shown in FIG. 3 and described above.

With the foregoing in mind, print head 104 may function in substantially the same manner as previously described above. That is, print head 104 may be articulated by a drive mechanism and a motor, e.g., in a response to commands from a controller. At the same time, print head 104 (or, more specifically, processing portion 106 thereof) may receive part material 122, e.g., from a material store. As previously noted, processing portion 106 may soften the part material and may provide the resulting softened part material to nozzle 108. The part material may then be forced through one or more apertures of nozzle 108 to form a working layer, e.g., on a print bed 110 or a previously deposited layer. This concept is illustrated in FIG. 4, which depicts nozzle 108 as depositing a working layer 403 of relatively hot, relatively viscous part material 122 onto an upper surface of a previously deposited layer 407.

With the foregoing in mind, in this embodiment reinforcement head 406 is configured to form reinforcing structures 407 on or within working layer 403. In that regard reinforcement head 406 includes biasing member 402, which may be disposed within housing 410. In general, biasing member 402 may be configured to be extendable and retractable though an opening 412 in a tip 411 of housing 410. Extension and retraction of biasing member 402 may be accomplished in any suitable manner. For example, in some embodiments biasing member may be mechanically, magnetically, or pneumatically actuated from an extended to a retracted position and vice versa.

When in the extended position, at least a portion of biasing member 412 may extend through opening 412 and partially through the thickness T of working layer 403, so as to cause the production of reinforcing structures 407. For example, in the illustrated embodiment reinforcing structures 407 are shown in the form of holes or grooves which extend partially through the thickness T of working layer 403.

To form reinforcement structures in the form of holes, biasing member 402 may be actuated quickly from a retracted position to an extended position, so as to "punch" into a surface of working layer 403. In the illustrated embodiment, biasing member 402 is configure to punch into an upper surface working layer 403, but it should be understood that in some embodiments, biasing member 402 is configured to punch into other surfaces (e.g., side surfaces of working layer 403). In any case after it punches into a surface of working layer 403, biasing member 402 may be retracted, resulting in the production of a reinforcement structure 407 in the form of a hole in working layer 403. As may be appreciated, the number, placement, and depth of such holes may be adjusted by exercising appropriate control over the extension and retraction of biasing member 402. Moreover, the size (e.g., cross sectional dimensions) of such holes may be determined by various factors, such as the dimensions of biasing member 402 (which may be fixed or adjustable), the viscosity of working layer 403 at the time biasing member is used to form reinforcing structures 407, and the degree to which the material of working layer 403 plastically deforms after the initial formation of reinforcement structures 407 and prior to hardening or curing of the material of working layer 403.

Alternatively or additionally, biasing member 402 may be configured to form other types of reinforcement structures 407 such as channels, grooves, etc., as noted above. For example, to form reinforcement structures in the form of grooves, biasing member 402 may be actuated from a retracted to an extended position, such that at least a portion thereof extends into a surface of working layer 403. Biasing member 403 may then be retained in its extended position (e.g., indefinitely or for a predetermined period of time) as it (and optionally print head 104) are moved in the machine direction. For example in some instances biasing member may be configured as a "tail rake" that is positioned downstream of nozzle 108 of print head 104, and which may be dragged through the material of working layer 403 to form channels, grooves, or the like in a surface thereof. Moreover in some embodiments biasing member 403 may also be laterally actuated (e.g., moved towards the shoulder regions of the upper surface of working layer 403), so as to change the position of at least a portion of the grooves, channels, etc. in the upper surface of working layer 403, e.g., with a sinusoidal, cross hatch, irregular, or other suitable pattern.

It is noted that the foregoing description assumes that reinforcement head 406 may move in tandem with print head 104 in the machine direction as print head 108 is used to deposit working layer 403. It may therefore be appreciated that in some instances, the material of working layer 403 may be in a relatively hot and relatively viscous state at the time it reaches opening 412 of reinforcement head 406. This may facilitate relatively easy insertion and movement of biasing member 402 therein, enabling biasing member 402 to be used as noted above without modification. However in some instances the material of working layer 403 may have properties that may make it relatively difficult to insert and/or move biasing member therein.

For example when reinforcement head 406 is positioned relatively far downstream from nozzle 108, the material of working layer 403 may cool substantially by the time it reached opening 412 of housing 410. As a result, the material of working layer 403 may be solid and/or may exhibit relatively high viscosity at the time it reaches opening 412, potentially hampering the insertion and/or movement of biasing member 402. This may be particularly problematic in instances where reinforcement head 406 may move independently of print head 104 and may be applied to form reinforcing structures well after the initial deposition of the material of working layer 403. It may therefore be desirable to take action to facilitate the insertion and/or movement of biasing member 402 within the material of working layer 403.

Accordingly, in some embodiments reinforcement head 406 may include a resistive or other heating element (not shown) which may be configured to raise the temperature of biasing member 402. In such instances, the heating element may be applied to heat biasing member 402, e.g., to a temperature that exceeds the glass transition temperature and/or melting point of the material of working layer 403. Contact between biasing member 402 and the material of working layer 403 (or a previously deposited layer) may therefore cause the material to soften and/or melt, thereby facilitating insertion and/or movement of biasing member 403 therein.

Alternatively or additionally, reinforcement head 406 may include optional solvent store 409, which in the embodiment of FIG. 4 is illustrated as being disposed within housing 410. To facilitate insertion and/or movement of biasing member 402 within working layer 403, solvent store may be configured to coat all or a portion of the external surface of biasing member 402 with a solvent that is designed to soften and/or dissolve the material of working layer 403. The nature and efficacy of the chemical solvent will depend on the material of working layer 403, as would be understood in the art. For example, acetone may be used as a solvent in instances where acrylonitrile butadiene styrene is used to form layers of an additively manufactured part, whereas tetrahydrofuran may be used as a solvent in instances where PLA (polylactic acid) is used to form such layers. Of course such solvents are listed for the sake of example only, and any suitable solvent may be used.

FIG. 4 also demonstrates how reinforcing structures may be applied to enhance the mechanical engagement of two adjacent layers in an additively manufactured article. Specifically, FIG. 4 illustrates an embodiment in which working layer 403 is being deposited on a previously deposited layer $405_n$, wherein the previously deposited layer $405_n$ includes reinforcement structures 407 that were formed during a previous pass of print head 104 and reinforcement head 406. As can be seen, the material of working layer 403 flows into reinforcement structures 407 within previously deposited layer $405_n$ as working layer 403 is deposited, resulting in the production of reinforcement regions 415. In some instances, the material of working layer 403 may fuse or otherwise chemically or mechanically engage with the material of previously formed layer $405_n$ within regions 415 (i.e., within the reinforcing structures 407 in previously formed layer $405_n$). Alternatively or additionally, solidification of the material of working layer 403 within regions 415 may mechanically interfere with the relative movement of working layer 403 and previously deposited layer $405_n$ in one or more dimensions.

While the foregoing description focuses on the use of a physical biasing member to form reinforcing structures within a working layer, it should be understood that the use of a physical biasing member is not required and that other mechanisms of forming reinforcing members are contemplated by the present disclosure. In that regard reference is made to FIG. 5, which is a schematic illustration of another example of an additive manufacturing system 500 including a reinforcement head configured to produce reinforcing structures in a working layer, consistent with the present disclosure.

Figure 5:
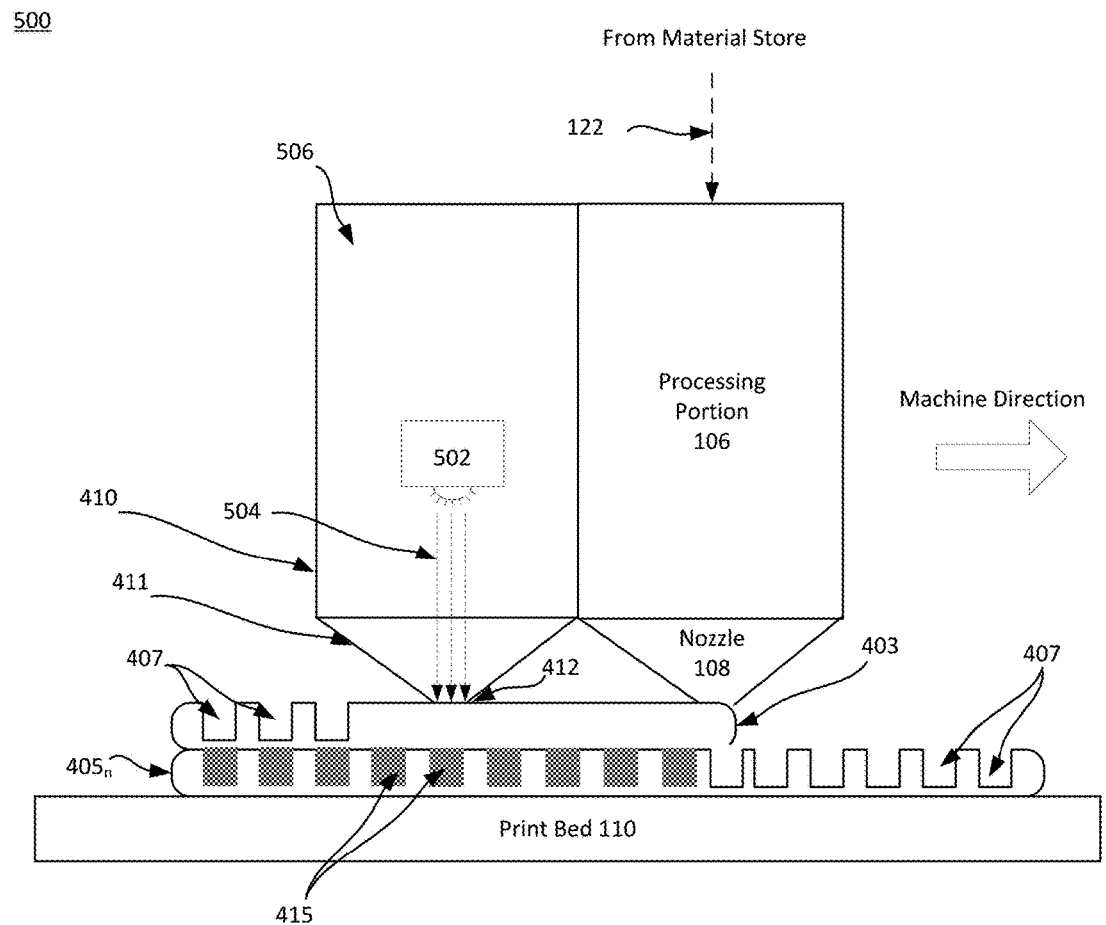
FIG. 5 is a schematic illustration of another example of an additive manufacturing system including a reinforcement head configured to produce a reinforcing structure in a working layer, consistent with the present disclosure.

As can be seen, FIG. 5 depicts an additive manufacturing system 500 that includes many of the same components as manufacturing system 400. Therefore in the interest of brevity, the nature and operation of the components of FIG. 5 that are in common with FIG. 4 are not reiterated. With that in mind, as shown additive manufacturing system 500 includes a reinforcement head 506, which is configured to form reinforcement structures 407 within working layer 403. Unlike reinforcement head 406 however, reinforcement head 506 does not include biasing member 402 or optional solvent store 409. Rather, reinforcement head 506 is configured to produce reinforcement structures 407 via the application of directed energy.

In that regard reinforcement head 506 includes directed energy source 502, which may be configured to direct energy 504 towards a surface of working layer 403, e.g., via opening 412. Directed energy source 502 may be any suitable source of directed energy, such as a light source, a radio frequency (RF) or microwave transmitter, combinations thereof, and the like. Non-limiting examples of suitable light sources that may be used as directed energy source 502 include lasers, laser diodes, light emitting diodes, halogen lamps, etc., which may emit light in the ultraviolet, visible, and/or infrared regions of the electromagnetic spectrum. Without limitation, in some embodiments directed energy source 502 is in the form of a laser, an RF transmitter, or a microwave transmitter. In such instances, directed energy 504 may be in the form of laser light, RF waves, and/or microwaves.

In any case, directed energy 504 may be produced by directed energy source 502 and exit housing 410 via opening 412, so as to impinge on a surface of working layer 403. The directed energy 504 may cause the removal of at least a portion of the material of working layer 403, e.g., via evaporation, vaporization, sublimation, combustion, or another suitable mechanism, thereby producing reinforcing structures 407 such as those previously described.

The depth of reinforcing structures 403 may be set by controlling the amount of time the surface of working layer 403 is exposed to directed energy 504. This may be accomplished for example by pulsing or otherwise controlling the emission of directed energy by directed energy source 502, controlling the power level of such directed energy, and/or by controlling the rate at which reinforcement head 306" is moved relative to a surface of working layer 403. Like biasing member 402, in some embodiments directed energy source 502 may be movable in the x, y, or z direction (e.g., by a gantry or another suitable mechanism) thereby facilitating the production of reinforcement structures of different configurations.

While the description of FIG. 5 focuses on embodiments in which directed energy in the form of light, RF waves, or microwaves is used to forming reinforcing structures 407, it should be understood that other mechanisms may also be used to form such structures. For example, in some embodiments reinforcement head 506 may produce reinforcement structures 407 pneumatically (e.g., with controlled bursts of air or another gas), by the application of heat to a surface of working layer 403 (e.g., from one or more heating elements), by exposing one or more portions of a surface of working layer 403 to electricity, electrical fields, and/or magnetic fields, combinations thereof, and the like.

Figure 6:
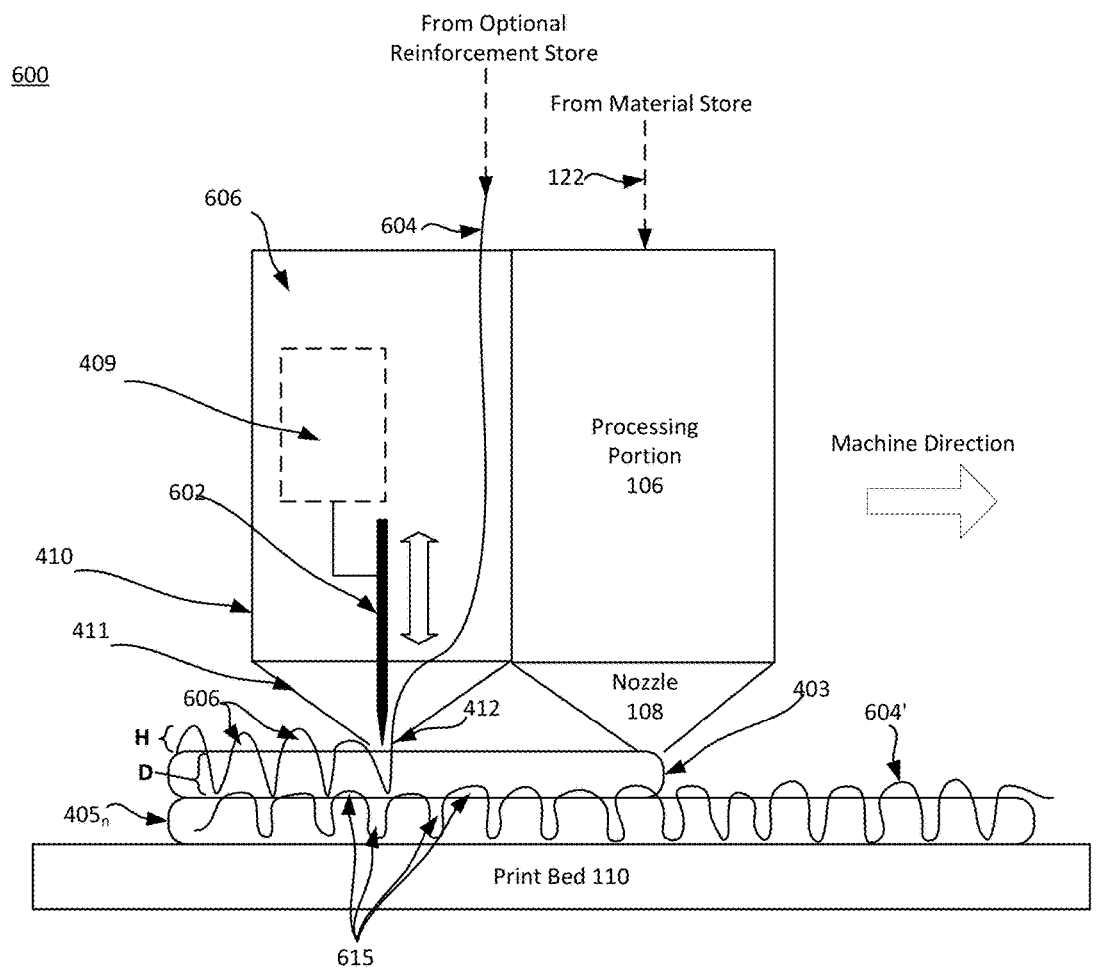
FIG. 6 is a schematic illustration of one example of an additive manufacturing system including a reinforcement head configured to install a reinforcing article in a working layer, consistent with the present disclosure.

Reference is now made to FIG. 6, which is a schematic illustration of another example of an additive manufacturing system 600 that includes a reinforcement head configured to install one or more reinforcing articles in a working layer. In particular, FIG. 6 illustrates an embodiment in which a reinforcement head 606 is configured to install a reinforcing article in the form of a sewn thread, yarn, fiber, or the like, within one or more surfaces of layer. Like FIGS. 4 and 5, it is noted that for the sake of clarity, FIG. 6 provides a zoomed in view of the print head 104 and reinforcement head 606 as they are used to form a working layer that includes one or more reinforcement articles, e.g., in an additive manufacturing operation. It should be understood however that additive manufacturing system 600 may include other components, such as but not limited to the various components of additive manufacturing systems 300, 400, and 500 described above.

As can be seen, additive manufacturing system 600 includes many of the same components as additive manufacturing system 400 of FIG. 4. The nature and function of such components is therefore not reiterated in the interest of brevity. It can be seen that unlike the embodiments of FIGS. 4 and 5, additive manufacturing system 600 includes a reinforcement head 606 including a biasing member 602. Like biasing member 402, biasing member 602 may be configured to be moveable from a retracted to an extended position and vice versa. However instead of or in addition to forming reinforcement elements in the manner described above in connection with the operation of biasing member 402, biasing member 602 is configured to install reinforcement article 604 within working layer 403.

Reinforcement head 606 may therefore be configured to receive reinforcement article 604, e.g., from an optional reinforcement store 308. In such instances controller 114 may be configured to send commands to reinforcement store 308, which may cause reinforcement store 308 to provide reinforcement article 604 to reinforcement head 606 in any suitable manner. For example where reinforcement article 604 is in the form of an elongated body such as a wire, filament, yarn, or the like as shown in FIG. 6, reinforcement store 308 may be configured to house a spool of reinforcement article 604 and to advance the reinforcement article 604 to reinforcement head, e.g., using a worm drive, screw drive, or in some other suitable fashion. The rate at which reinforcement article 604 is provided may depend on various factors, such as the rate of deposition of working layer 403, the movement speed of print head 104 and/or reinforcement head 606, the oscillation rate of biasing member 602 (i.e., rate at which biasing member 602 is retracted and extended), the number of reinforcement regions 415' to be formed, combinations thereof, and the like.

As shown in FIG. 6 and as mentioned above, reinforcement article 604 may be in the form of an elongated body, such as a wire, a yarn, a filament, or a combination thereof, which may be made of any suitable material or combination of materials. Non-limiting examples of suitable materials that may be used to form all or a portion of reinforcement article 604 include wires, yarns, filaments, etc. made of or including carbon fiber, aromatic compounds, polyamide, polyester, polyolefin, nylon (e.g., nylon-66, metal (e.g., titanium, tungsten, copper, etc.), combinations thereof, and the like. In some embodiments, reinforcement article 604 may be in the form of a wire that includes a core that is coated or otherwise covered with a shell, wherein the core is formed from or includes a first material and the shell is formed from or includes a second material. In some instances the first and second may materials have different electrical properties. For example, in some embodiments the core may be formed from a non-conductive material such as a polyamide, polyolefin, polyester, or the like, whereas the shell may be formed from a conductive material such as a conductive polymer, a metal, carbon fiber, or the like. Alternatively in some embodiments, the shell may be formed from a non-conductive material, whereas the core may be electrically conductive.

To install reinforcement article 604 into working layer 403, biasing member 602 may be articulated from a retracted to an extended position and vice versa, as noted above. As biasing member 602 is retracted or while it is in the retracted position, reinforcement article 604 may be fed towards and through opening 412 of nozzle 411, such that at least a portion of it is in proximity to a surface of working layer 403. Thereafter, biasing member 602 may be moved to its extended position. As it is extended, a tip or other portion of biasing member 602 may engage and urge reinforcement article 604 against a surface of working layer 403.

In the illustrated embodiment, the portion of biasing member 602 that engages reinforcement article 604 may be extended at least partially through the thickness T (not shown) of working layer 403. As a result, a portion of reinforcement article 604 may be pushed into working layer 403 to a depth D, which may vary or may be consistent along the length of working layer 403. As may be appreciated, the depth D may be set by exercising appropriate control over the degree to which biasing member 602 is extended. In any case, depth D may range from greater than 0 to about 99% of the thickness T of working layer 403, such as from greater than or equal to about 10% to about 95%, greater than or equal to about 20% to about 90%, greater than or equal to about 25% to 75%, or even greater than or equal to about 50 to about 75% of the thickness T of working layer 403. Insertion and/or movement of biasing member 602 within working layer 403 may be facilitated by heating and/or via application of a solvent (e.g., from optional solvent store), as previously described in connection with FIG. 4.

As noted previously, reinforcement article 604 is fed toward and through opening 412 of housing 410 as working layer 403 is being deposited. In some embodiments and as shown in FIG. 6, the amount of reinforcement article 604 proximate to the surface of working layer 403 prior to its engagement with biasing member 602 may be set such that at least a portion of reinforcement article 604 remains above the surface of working layer 403 following the extension of biasing member 602. As a result, such portions of reinforcement article 604 may form one or more loops 606 that extend away from the surface of working layer 403. As may be appreciated, the formation of loops 606 may also be controlled at least in part by the distance D to which biasing member 601 is extended during the installation of reinforcement article 604 into working layer 403

As can be seen, loops 606 may extend a distance H from the surface of working layer 403. In such instances, H may be consistent between loops or may vary along the length of working layer 403, and may be the same as of different from the depth D to which reinforcement article 604 extends into working layer 403. In any case, distance H may range from greater than 0 to about 99% of the thickness T of working layer 403, such as from greater than or equal to about 10% to about 95%, greater than or equal to about 20% to about 90%, greater than or equal to about 25% to 75%, or even greater than or equal to about 50 to about 75% of the thickness T of working layer 403. As may be appreciated, distance H may be set by exercising appropriate control over the amount of reinforcement article 604 that is fed through opening 412, by exercising control over the distance to which biasing member 602 is extended, or a combination thereof. In some embodiments, reinforcement member 604 has structural properties that enable distance H to be substantially maintained until loops 606 may be covered, e.g., by a subsequently deposited working layer.

Although FIG. 6 depicts an embodiment in which biasing member 602 moves vertically to install reinforcement article 604 into working layer 403, it should be understood that biasing member may have additional degrees of freedom. For example, in some embodiments biasing member 602 may be configured to be movable in three dimensions, such that the position of reinforcement article 606 may controlled vary laterally as well as vertically within working layer 403. In that way, biasing member 602 may be leveraged to sew or otherwise install reinforcement article 604 into working layer 403. For example, in some embodiments biasing member 602 may be configured to install reinforcement article 604 in a single, double, triple, or cross stitched manner, or some combination thereof.

FIG. 6 further demonstrates how reinforcement article 604 may be employed to enhance the mechanical engagement of two adjacent layers in an additively manufactured article. Specifically, FIG. 6 illustrates an embodiment in which working layer 403 is being deposited on a previously deposited $405_n$, wherein the previously deposited layer $405_n$ includes a reinforcement article 604' that was installed in a previous layer during another pass of print head 104 and reinforcement head 606. As can be seen, the material of working layer 403 flows out of nozzle 108 and onto or into proximity with previous layer $405_n$. The relatively hot, relatively viscous material of working layer 403 may contact and cover at least a portion of reinforcement article 604' that is present on or above the surface of previous layer $405_n$, such as loops formed thereby. In some instances, the material of working layer 403 may fuse or otherwise chemically or mechanically engage with reinforcement article 604' and/or the material of previous layer $405_n$. Alternatively or additionally, solidification of the material of working layer 403 on or around reinforcement article 604' may form reinforcement regions, e.g., regions 615, which may mechanically interfere with the relative movement of working layer 403 and previously deposited layer $405_n$ in one or more dimensions.

While the above discussion of FIG. 6 focuses on embodiments in which a biasing member may insert a reinforcement article into a working layer such that reinforcement regions 615 are formed, it should be understood that insertion of a reinforcement article is not required. In that regard references is made to FIG. 7, which depicts another embodiment of an additive manufacturing system consistent with the present disclosure. As shown, additive manufacturing system 700 includes many of the same components as additive manufacturing system 600. The nature and operation of such components is therefore not reiterated. Unlike additive manufacturing system 600 however, additive manufacturing system 700 includes reinforcement head 706, which in turn includes biasing member 702.

Like biasing member 602, biasing member 702 is configured to be repositionable from a retracted to an extended position. Unlike biasing member 602 however, biasing member 702 is not configured to insert and/or sew reinforcement member into working layer 403. Rather, biasing member 702 is configured such that when it is extended, it engages with and urges reinforcement article 704 against the surface of working layer 403. As a result, all or a portion of reinforcement article may be embedded or otherwise adhered to the surface of working layer 403. With that in mind, in some embodiments reinforcement article 704 may be an elongated body such as a wire, yarn, thread, or the like, which has been treated with an adhesive or other agent. The adhesive or other agent may be configured to bond strongly with the material of reinforcement article 704, to the material and surface of working layer 403 and, in some instances, to the material and surface of subsequently deposited layers with which it may come into contact. In such instances, use of the adhesive or other agent may result in the formation of chemical, physical or other bond between reinforcement article 704 and the material of working layer 403, as well as between reinforcement article 704 and the material of a subsequently deposited layer. Of course, treatment of a reinforcement article with such an adhesive or other agent is not limited to this embodiment, and may be performed in other embodiments as well (e.g., those shown in FIGS. 4-6 and 8) with the same or similar end result.

Figure 7:
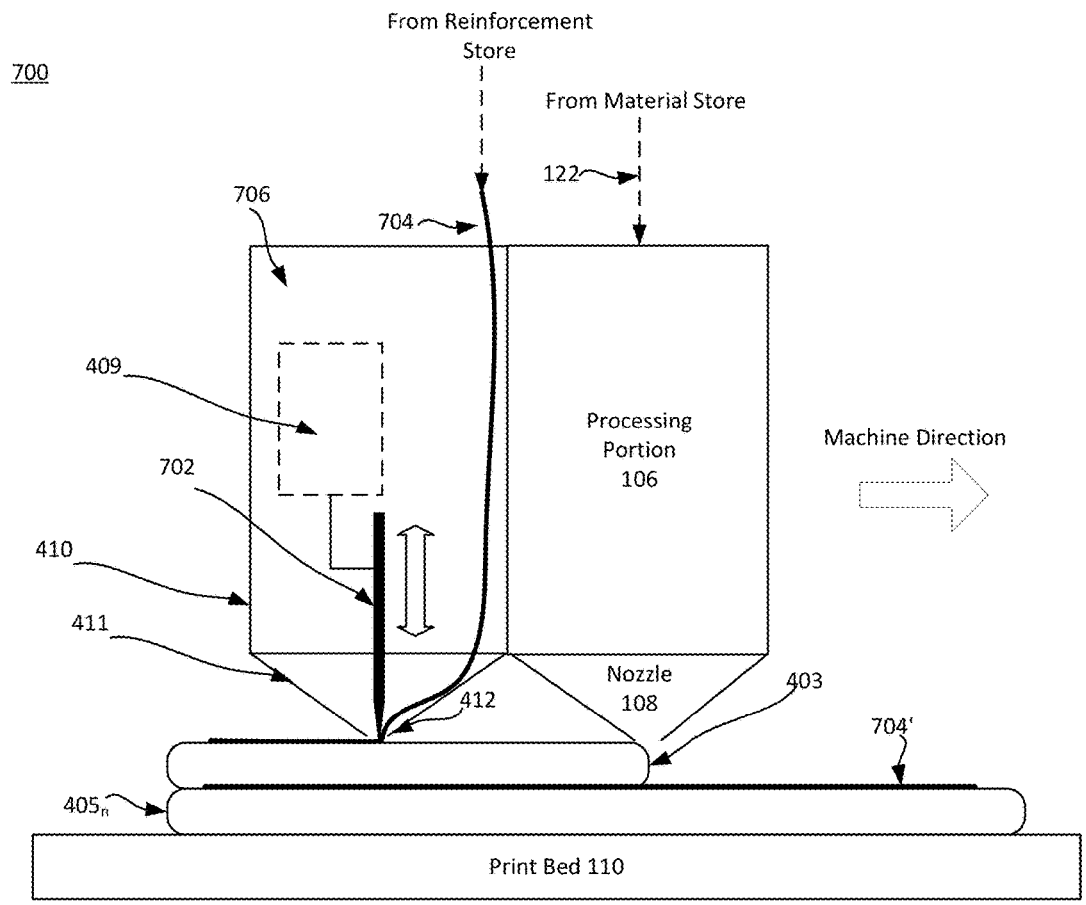
FIG. 7 is a schematic illustration of another example of an additive manufacturing system including a reinforcement head configured to install a reinforcing article on a working layer, consistent with the present disclosure.

FIG. 7 further demonstrates how reinforcement article 704 may be employed to enhance the mechanical engagement of two adjacent layers in an additively manufactured article. Specifically, FIG. 7 illustrates an embodiment in which working layer 403 is being deposited on a previously deposited layer $405_n$, wherein the previously deposited layer $405_n$ includes a reinforcement article 704' that was installed during another pass of print head 104 and reinforcement head 706. As can be seen, the material of working layer 403 flows out of nozzle 108 and onto or into proximity with previous layer $405_n$. The relatively hot, relatively viscous material of working layer 403 may contact and cover at least a portion of reinforcement article 704' that is present on or above the surface of previous layer $405_n$. When reinforcement article is coated with an adhesive or other agent, the material of working layer 403 may bond or otherwise adhere to reinforcement article 704', as discussed previously. Alternatively or additionally, in instances where reinforcement article 704' includes extensions 706, the material of working layer 403 may solidify on or around such extensions. As a result, the extensions 706 may mechanically interfere with the relative movement of working layer 403 and previously deposited layer $405_n$ in one or more dimensions.

While the above discussion of FIGS. 6 and 7 focus on embodiments in which a biasing member in the form of an elongated body (e.g., a wire, filament, or the like) may be installed on or within a working layer, other types of reinforcement articles may also be used. For example, in some embodiments, reinforcement articles in the form of discrete posts, jacks, rods, bones, tetrapods, insertion angles, combinations thereof, and the like may be used. Such reinforcement articles may be installed on or fully or partially embedded within a working layer, as desired.

Figure 8:
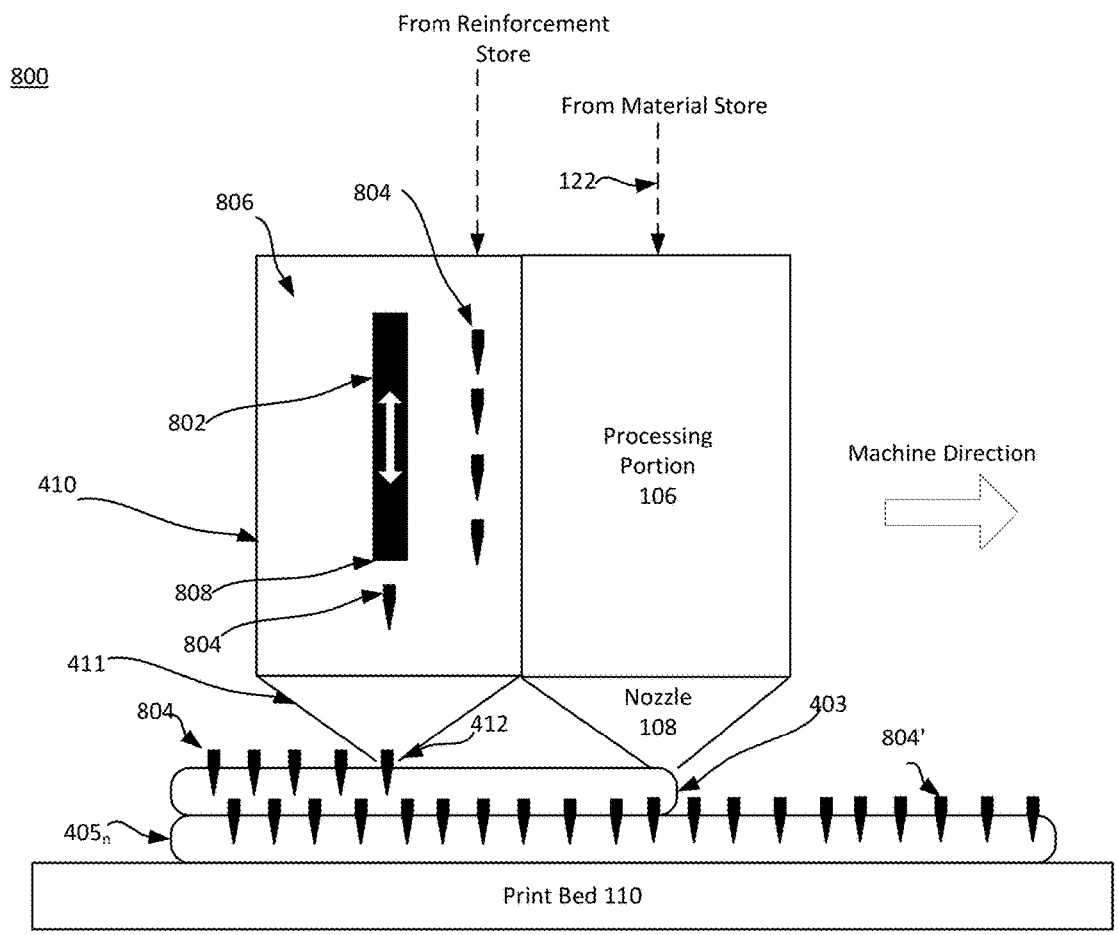
FIG. 8 is a schematic illustration of yet another example of an additive manufacturing system including a reinforcement head configured to install a reinforcing article in a working layer, consistent with the present disclosure.

To illustrate this concept reference is made to FIG. 8, which depicts another embodiment of an additive manufacturing system consistent with the present disclosure. As shown, additive manufacturing system 800 includes many of the same components as additive manufacturing systems 500, 600 and 700. The nature and operation of such components is therefore not reiterated. Unlike those previously described systems however, additive manufacturing system 700 includes reinforcement head 806 which is configured to install discrete reinforcement articles 804 on or within working layer 403.

In that regard, additive manufacturing system 800 may include a reinforcement store which is configured to store and feed discrete reinforcement articles 804 to reinforcement head 806 in any suitable manner. For example, in some embodiments reinforcement store may be configured to supply one or plurality of individual discrete reinforcement articles to reinforcement head via mechanical of other means. In some embodiments, reinforcement articles 804 may be coupled or adhered to a conveyor body such as tape, ribbon, chain, or other structure. In such instances, the reinforcement store may be configured to convey reinforcement articles 804 to reinforcement head 806 via the conveyor body, e.g., in response to commands from a controller.

The supply of discrete reinforcement articles to reinforcement head 806 is illustrated in FIG. 8, which depicts reinforcement elements 804 as being conveyed to a portion of reinforcement head 806 that is proximate reinforcement install member 802. Although not shown, in some embodiments reinforcement head 806 may include a receiving port that is configured to receive reinforcement articles from reinforcement store. In such instances the receiving port may be coupled to a channel that extends from the receiving port to a region proximate install surface 808 of install member 802. Reinforcement articles 804 received via the port may be conveyed through the channel and loaded for installation by install member 802.

Of course reinforcement articles 804 need not be stored and/or conveyed in the above manner, and may be supplied for installation in any suitable manner. For example, in some embodiments install member 802 may include a reinforcement store, eliminating the need for a receiving port and channel as noted above. Alternatively or additionally, reinforcement articles 804 may manually loaded into reinforcement head 806 and/or install member 802 for installation into working layer 403.

Regardless of how reinforcement articles 804 are provided, install member 802 may be configured to install reinforcement articles on or within working layer 403. Such installation may be accomplished in any suitable manner. For example and as shown In FIG. 8, install member 802 may be vertically moveable between upper and lower positions. As install member 802 is retracted to or is present at its upper position, a reinforcement article 804 may be loaded proximate to install surface 808. Install member 802 may then be moved (e.g., rapidly) to its lower position. During such movement, install member 802 (or, more particularly, install surface 808 thereof) may contact reinforcement article 804 and drive it through opening 412 and into a surface of working layer 403.

In some embodiments, install surface 808 may be driven against reinforcement article 804 with sufficient force to expel reinforcement article through opening 412 and into the surface of working layer 403. In such instances it may be appreciated that install surface 808 may not remain in contact with reinforcement article 804 through its installation. Alternatively in other embodiments install surface 804 may urge or push against reinforcement article 804 continuously through its installation into working layer 403.

While FIG. 8 illustrates an embodiment in which an install surface 808 of an install member 802 is used to impart force to embed reinforcement member 804 into working layer 403, install member 802 may be configured to install reinforcement members 804 in other ways. For example, in some embodiments install member may be in the form of or include a pneumatic head and/or a magnetic head which may be configured to drive reinforcement members 804 into the surface of working layer 403 via controlled bursts of air or another gas and/or via the application of a magnetic field. Still further, in some embodiments reinforcement members 804 may screw like and include a threaded body and a head. In such instances, install member 802 may be configured with components that screw reinforcement members 804 into the surface of working layer 403.

Returning to the embodiment of FIG. 8, as shown install member 802 may be configured to install a plurality of reinforcement members 804 into the surface of working layer 403. The number and placement of reinforcement members 804 may be controlled as desired. For example, in some embodiments reinforcement members may be installed in a random, non-random (e.g., pattern), homogenous, or non-homogenous fashion (or some combination thereof), as desired.

The depth to which reinforcement articles 804 may be installed into working layer 403 may be set by exercising appropriate control over install member 802. In some embodiments, reinforcement articles 804 may be installed such that at least a portion of the reinforcement article is embedded in the surface of working layer 403, and at least a portion of the reinforcement article extends out from the surface of working layer 403. The depth to which the reinforcement articles may be embedded and the height to which the reinforcement articles may extend away from the surface of working layer 403 may range as set forth above with regard to the depth and height of reinforcement member 604 in FIG. 6.

FIG. 8 further demonstrates how reinforcement article 804 may be employed to enhance the mechanical engagement of two adjacent layers in an additively manufactured article. Specifically, FIG. 8 illustrates an embodiment in which working layer 403 is being deposited on a previously deposited layer $405_n$, wherein the previously deposited layer $405_n$ includes a plurality of reinforcement articles 804' that were installed during another pass of print head 104 and reinforcement head 806. As can be seen, the material of working layer 403 flows out of nozzle 108 and onto or into proximity with previous layer $405_n$. The relatively hot, relatively viscous material of working layer 403 may contact and cover at least a portion of reinforcement articles 804' that are present on or above the surface of previous layer $405_n$.

Consistent with the previous description, in some embodiments reinforcement articles 804, 804' may be coated with an adhesive or other agent. In such instances the material of working layer 403 may bond or otherwise adhere to reinforcement article 804', as discussed previously. Alternatively or additionally, the material of working layer 403 may solidify on or around the exposed portions of reinforcement articles 804'. As a result, the reinforcement articles 804' may mechanically interfere with the relative movement of working layer 403 and previously deposited layer $405_n$ in one or more dimensions.

Figure 9:
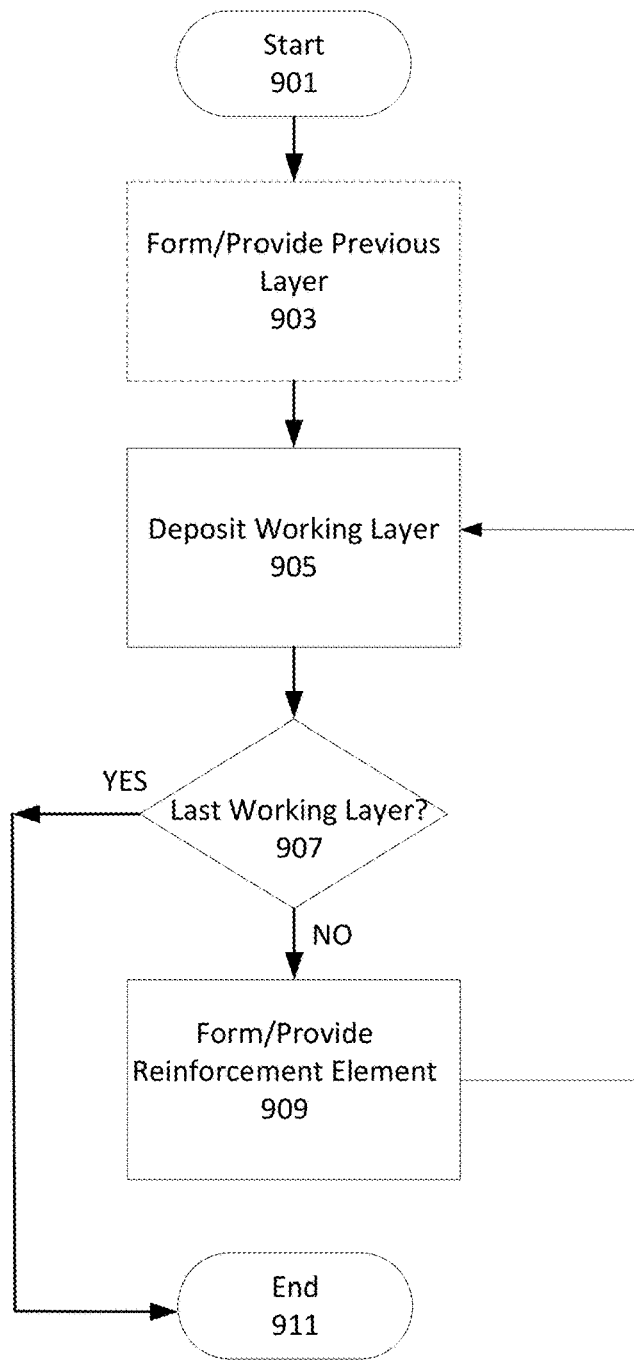
FIG. 9 is a flow diagram of operations of one example method of forming a part via additive manufacturing, consistent with the present disclosure.

Another aspect of the present disclosure relates to methods of reinforcing additively manufactured articles. Reference is therefore made to FIG. 9, which is a flow diagram of example operations of a method of reinforcing an additively manufactured article consistent with the present disclosure. As shown, method 900 begins at block 901. The method may then proceed to optional block 903, pursuant to which one or more previous layers may be formed via an additive manufacturing technique, such as fused filament fabrication or another technique as described above. For example, in some embodiments one or more previously deposited layers may be formed by fused filament fabrication on a print bed or another suitable surface.

Following the operations of optional block 903 or if such operations are omitted the method may proceed to block 905, pursuant to which a working layer may be deposited by a print head. Deposition of the working layer may occur in any suitable manner, such as by fused filament fabrication or another suitable additive manufacturing technique, as noted above. Without limitation, in some embodiments one or more working layers are deposited by fused filament fabrication from a print head that is coupled to a reinforcement head, as shown and described above in connection with one or more of FIGS. 3-8.

Following or concurrent with the operations of block 905 the method may proceed to block 907, pursuant to which a determination may be made as to whether the working layer deposited pursuant to block 905 was a last working layer, e.g., in a part or a portion of a part that is being built up. If so the method may proceed to block 911 and end, but if not the method may proceed to block 909. Pursuant to block 909, one or more reinforcement elements may be formed on and/or installed into the working layer produced pursuant to block 905. For example and as described above in conjunction with FIGS. 4 and 5, in some embodiments one or more reinforcement structures may be formed in an upper and/or side surface of a working layer, e.g., by a biasing member, application of directed energy, or the like. Alternatively or additionally and as described above in conjunction with FIGS. 6-8, a reinforcement head may be applied to install one or more reinforcement articles into an upper and/or side surface of a working layer.

Following the operations of block 909 the method may loop back to block 905, pursuant to which another working layer may be deposited. The method may continue in that manner until it is determined pursuant to block 907 that a working layer deposited pursuant to block 905 is a last working layer, in which case the method may proceed to block 911 and end.

While the above discussion focuses on methods in which reinforcement elements are only formed in working layers other than a last working layer in a part or a portion of a part, it should be understood that omission of reinforcement elements from a last working layer is not required. Indeed in some embodiments, a last working layer in a part or a portion of a part may include one or more reinforcement elements, as described above. In such instances it may be understood that block 909 may follow block 905, block 907 may be omitted, and a decision block following block 909 may be added, pursuant to which a determination may be made as to whether the method is to continue after the formation of one or more reinforcement elements. If so the method may loop back to block 905. But if not, the method may proceed to block 911 and end.

As may be appreciated from the foregoing, the technologies of the present disclosure leverage the use of reinforcement elements that may function to facilitate mechanical, physical, and/or chemical interlocking of a working layer with one or more previously deposited layers, e.g., in an additive manufacturing process. As a result, various properties (e.g., shear and/or tensile strength) a structure formed by a working layer and a previously deposited layer may be enhanced in one or more dimensions, relative to such properties in the absence of reinforcing elements. This enhancement may be localized to certain regions of an additively manufactured part, or may enhance the strength or other properties of the part as a whole.

As used herein, the term "substantially" when used in conjunction with a value or a range means plus or minus 5% of the value or endpoints of the range, respectively.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A print head assembly for additive manufacturing, comprising:
    a print head configured to deposit a plurality of layers during the production of an additively manufactured article; and
    a reinforcement head configured to form at least one reinforcement element on or within a working layer of said plurality of layers;
    wherein:
    said at least one reinforcement element comprises a reinforcement structure;
    said reinforcement head comprises:
        a housing comprising an opening; and
        a biasing member;
    the biasing member is movable between a retracted position and an extended position;
    in the retracted position the biasing member is disposed within said housing; and
    in the extended position at least a portion of the biasing member extends out of the opening and is at least partially inserted into the working layer to form said at least one reinforcement element.

2. The print head assembly of claim 1, wherein said reinforcement element is configured such that the coupling of said working layer and another layer of said plurality of layers is enhanced over the coupling between an identical working and said other layer in the absence of said at least one reinforcement element.

3. The print head assembly of claim 1, wherein the reinforcement structure is selected from the group consisting of one or more channels, dimples, holes, grooves, moats, ridges, slots, cross hatched features, or a combination thereof.

4. The print head assembly of claim 1, wherein said at least one reinforcement element comprises a plurality of holes, a plurality of grooves, or a combination thereof.

5. The print head assembly of claim 1, further comprising a solvent store configured to coat the surface of the biasing member with a solvent prior to insertion of the biasing member into the working layer.

6. The print head assembly of claim 1, further comprising a heating element configured to raise a temperature of the biasing member above a glass transition temperature of a material forming said working layer.

7. The print head assembly of claim 1, wherein said reinforcement head comprises:
    a housing comprising an opening; and a
    a directed energy source; wherein:
    the directed energy source is configured to emit directed energy through said opening to impinge on said working layer, so as to form said at least on reinforcement element.

8. The print head assembly of claim 7, wherein said directed energy source is selected from the group consisting of: a light source, a radio frequency transmitter, a microwave transmitter, or a combination thereof.

9. A print head assembly for additive manufacturing, comprising:
    a print head configured to deposit a plurality of layers during the production of an additively manufactured article; and
    a reinforcement head configured to form at least one reinforcement element on or within a working layer of said plurality of layers;
    wherein:
    said at least one reinforcement element comprises at least one reinforcement article;
    said reinforcement head comprises:
        a housing comprising an opening; and
        a biasing member within the housing;
    the housing is configured to receive said reinforcement article from a reinforcement store;
    the biasing member is movable between a retracted position and an extended position;
    in the retracted position the biasing member is disposed within said housing;
    in the extended position at least a portion of the biasing member biases at least a portion of the reinforcement article towards a surface of the working layer.

10. The print head assembly of claim 9, wherein said at least one reinforcement article has a shape selected from group consisting of a jack, a tetrapod, a sphere, a rod, an elongated article, or a combination thereof.

11. The print head assembly of claim 9, wherein said at least one reinforcement article comprises an elongated article.

12. The print head assembly of claim 11, wherein in the extended position, at least a portion of the biasing member pierces the surface of the working layer so as to embed at least a portion of the reinforcement article therein.

13. The print head assembly of claim 11, wherein the biasing member is configured to sew the reinforcement article into the working layer.

14. The print head assembly of claim 12, wherein the biasing member is configured to sew the reinforcement article into the working layer such that at least a portion of the reinforcement article forms a loop above or below the surface of the working layer.

15. A print head assembly for additive manufacturing, comprising:
   a print head configured to deposit a plurality of layers during the production of an additively manufactured article; and
   a reinforcement head configured to form at least one reinforcement element on or within a working layer of said plurality of layers;
   wherein:
      said at least one reinforcement element comprises at least one discrete reinforcing article;
      said reinforcement head comprises:
         a housing comprising an opening; and
         an install member within the housing, the install member comprising an install surface proximate to said opening;
         the install member is movable between upper and lower positions within said housing;
         the install member is configured such that when it is moved from said upper position to said lower position, said install surface contacts said at least one discrete reinforcing article to drive the at least one discrete reinforcing article out of said opening, such that at least a portion of the at least one discrete reinforcing article is embedded into a surface of the working layer.

16. The print head assembly of claim 15, wherein said at least one discrete reinforcing article is in the form of a post.

17. The print head assembly of claim 1, wherein said reinforcement head is coupled to said print head such that said print head and said reinforcement head move in tandem in a machine direction during a formation of said working layer.

18. The print head assembly of claim 1, wherein said reinforcement head and said print head are independently moveable, relative to one another.

* * * * *